(12) United States Patent
Ezaki et al.

(10) Patent No.: US 8,699,830 B2
(45) Date of Patent: Apr. 15, 2014

(54) OPTICAL MODULATION DEVICE

(75) Inventors: Mizunori Ezaki, Kanagawa (JP); Nobuo Suzuki, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 304 days.

(21) Appl. No.: 13/075,775

(22) Filed: Mar. 30, 2011

(65) Prior Publication Data

US 2012/0057815 A1 Mar. 8, 2012

(30) Foreign Application Priority Data

Sep. 3, 2010 (JP) ................................. 2010-197798

(51) Int. Cl.
*G02F 1/025* (2006.01)
(52) U.S. Cl.
USPC ............................................................ 385/3
(58) Field of Classification Search
None
See application file for complete search history.

(56) References Cited

U.S. PATENT DOCUMENTS

| 6,845,198 | B2 | 1/2005 | Montgomery et al. | |
| 7,657,130 | B2 * | 2/2010 | Shastri et al. | 385/2 |

FOREIGN PATENT DOCUMENTS

| JP | 6-110089 A | | 4/1994 |
| JP | 06110089 A | * | 4/1994 |
| JP | 2006-515082 A | | 5/2006 |
| JP | 2008-268276 A | | 11/2008 |

OTHER PUBLICATIONS

Japanese Office Action Issued Jul. 3, 2012 in Patent Application No. 2010-197798 (with English translation).
G. T. Reed, et al., "Silicon optical modulators", Nature Photonics, vol. 4, Aug. 2010, pp. 518-526.

* cited by examiner

*Primary Examiner* — Sarah Hahm
(74) *Attorney, Agent, or Firm* — Oblon, Spivak, McClelland, Maier & Neustadt, L.L.P.

(57) ABSTRACT

An optical modulation device of an embodiment includes: a first p-type semiconductor region; a first n-type semiconductor region; a first low-impurity-density semiconductor region formed between the first p-type semiconductor region and the first n-type semiconductor region; a second n-type semiconductor region formed on an outer side of the first p-type semiconductor region via a second low-impurity-density semiconductor region; and a second p-type semiconductor region formed on an outer side of the first n-type semiconductor region via a third low-impurity-density semiconductor region. The carrier density in the first low-impurity-density semiconductor region is changed by current injection. The phase of light propagated through an optical waveguide structure that includes at least part of the first low-impurity-density semiconductor region is modulated.

14 Claims, 8 Drawing Sheets

OPTICAL MODULATION DEVICE

CROSS-REFERENCE TO RELATED APPLICATION

This application is based upon and claims the benefit of priority from Japanese Patent Applications No. 2010-197798, filed on Sep. 3, 2010; the entire contents of which are incorporated herein by reference.

FIELD

Embodiments described herein relate generally to optical modulation devices.

BACKGROUND

Microminiaturization of optical devices has been realized by using silicon (Si) optical wire waveguides having large differences in refractive index between the cores and the surrounding areas. A typical section size of a Si optical wire waveguide in a 1.55-μm wavelength band is 220 nm×450 nm. Because of strong optical confinement due to a large refractive-index difference, the radiation loss can be restricted to a small value even in a curved waveguide having a curvature radius of 5 μm or smaller. By applying the highly-advanced CMOS process technique, optical integrated circuits each including a number of optical or electronic micro devices can be mass-produced. Accordingly, optical devices are expected to be used not only in optical interconnects between devices and boards but also in large-capacity optical interconnects between/in chips that utilize the WDM (wavelength division multiplexing) technique.

To be used in optical interconnects, optical devices need to have the functions to transmit and receive optical signals. To be applied to optical interconnects between/in chips, optical devices should be made smaller in size, have lower power consumptions (higher efficiencies), and operate at higher speeds.

As for the receiving side, an efficiency in the neighborhood of 1 mA/mW and a band range of several GHz to several tens of GHz have been realized by Ge photodetectors of a waveguide type that are integrated with a Si optical wire waveguide. Such Ge photodetectors are 5 to 10 μm in length and are several μm in width.

Therefore, there is a need for Si optical modulators that are small in size, have low power consumptions (high efficiencies), have low insertion losses, operate at high speeds, and achieve sufficient extinction ratios. To be driven with a CMOS circuit, such optical modulators should preferably have lower drive voltages. However, there is a trade-off relationship between those requirements, and it is difficult to satisfy all the requirements at once.

DETAILED DESCRIPTION

Figure 1:
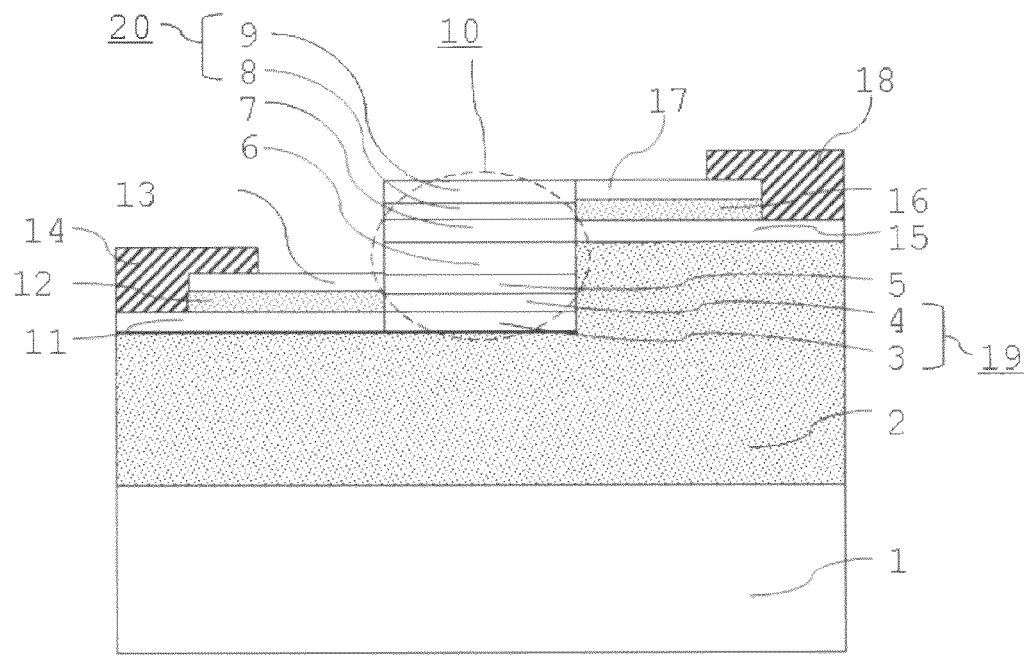
FIG. 1 is a drawing for explaining a cross-section structure of a phase modulator unit of an optical modulation device according to a first embodiment.

An optical modulation device of an embodiment includes: a first p-type semiconductor region; a first n-type semiconductor region; a first low-impurity-density semiconductor region formed between the first p-type semiconductor region and the first n-type semiconductor region; a second n-type semiconductor region formed on an outer side of the first p-type semiconductor region via a second low-impurity-density semiconductor region; and a second p-type semiconductor region formed on an outer side of the first n-type semiconductor region via a third low-impurity-density semiconductor region. The carrier density in the first low-impurity-density semiconductor region is changed by current injection. The phase of light propagated through an optical waveguide structure that includes at least part of the first low-impurity-density semiconductor region is modulated.

Embodiments of the invention will be described below with reference to the drawings.

The following is a description of the embodiments, with reference to the technical background.

As the principles applicable to Si optical modulators, the following two kinds of effects are widely known:

(i) the electroabsorption effects (the Franz-Keldysh effect and the quantum confined Stark effect), and
(ii) the carrier-plasma effect.

The electroabsorption effects (i) are to modulate absorption coefficients in the vicinities of a bandgap with an applied field at a high speed (several GHz to several tens of GHz) in principle. There is a trade-off relationship between the modulation efficiency, the extinction ratio, and the insertion loss, and modulation at several volts is necessary to obtain an extinction ratio of 10 dB. Also, to perform high-efficiency optical modulation in a 1.55-μm wavelength band in which Si optical wire waveguides are transparent, an optical waveguide having a tensile-stained Ge as a main component should be used, or InGaAs semiconductors need to be hybrid-integrated. Therefore, there are large restrictions on conditions in integrated device manufacturing processes, such as control on lattice defects and strains, the temperature cycles, and the like.

The carrier-plasma effect (ii) is to modulate the phase of light through a refractive index by changing the carrier density in a Si optical waveguide. It is a known fact that the refractive index variation An caused by carrier injection into Si can be approximated by Mathematical Formula 1. Here, $N_e$ represents the electron density, and $N_h$ represents the hole density. The coefficients $a_e$ and $a_h$ are proportional to the square of the wavelength. Where the wavelength is 1.55 μm, $a_e$ is $-8.8 \times 10^{-22}$ cm$^3$, and $a_h$ is $-8.5 \times 10^{-18}$ cm$^{2.4}$. When an optical phase modulator is used in a Mach-Zehnder interferometer or a microring resonator, the optical phase modulator can function as an optical intensity modulator.

$$\Delta n = a_e N_e + a_h N_h^{0.8} \qquad \text{Mathematical Formula 1}$$

As a general CMOS process can be utilized in the manufacture, the carrier-plasma effect (ii) is preferable to the electroabsorption effects (i). Optical modulators having the effect (ii) can be further classified into the following types:

(iia) a capacitor type having a thin insulating film between two semiconductor layers;

(iib) a type having an optical waveguide of a pn diode structure depleted through application of a backward voltage to the optical waveguide; and (iic) a type having carriers injected into an optical waveguide of a pin diode structure by supplying a forward current into the optical waveguide.

The capacitor type (iia) is capable of operating at a high speed in principle, and consumes only a small amount of electric power, not involving a DC current. However, there is a trade-off relationship between the high speed and the modulation efficiency, and at present, a modulation amplitude of 1 V or higher is required to perform high-speed modulation at an extinction ratio of 10 dB or higher. Also, a design for making a light propagation mode suitably overlapping with a thin accumulated/depleted region is required. A depletion-mode optical modulator of the type (iib) is also capable of responding at a high speed (up to several tens of GHz). Although a DC current does not flow, a considerably high applied voltage is required to perform optical intensity modulation at 10 dB or higher, and it is difficult to directly drive the optical modulator with a CMOS. Meanwhile, an optical modulator of the carrier-injection type (iic) can achieve an extinction ratio of 10 to 20 dB with a current variation of several milliamperes (or a voltage variation of 0.1 V or less) at a low frequency. However, a long period of time is required for carrier injection and discharge into and from the optical waveguide, and therefore, it is difficult to respond at a high speed.

As described above, even Si optical modulators of any of the above types cannot perform modulation at an extinction ratio of 10 dB or higher, at 10 Gbps, and at a drive voltage of 1V or lower, which is suitable for direct driving by a CMOS. In principle, low-voltage driving at a high speed should be possible, only if the response time of an optical modulator of the carrier-injection type (iic) that requires the lowest drive voltage at low frequencies can be shortened. The reason why that is difficult to achieve will be described below in detail, with reference to the accompanying drawings.

Figure 11:
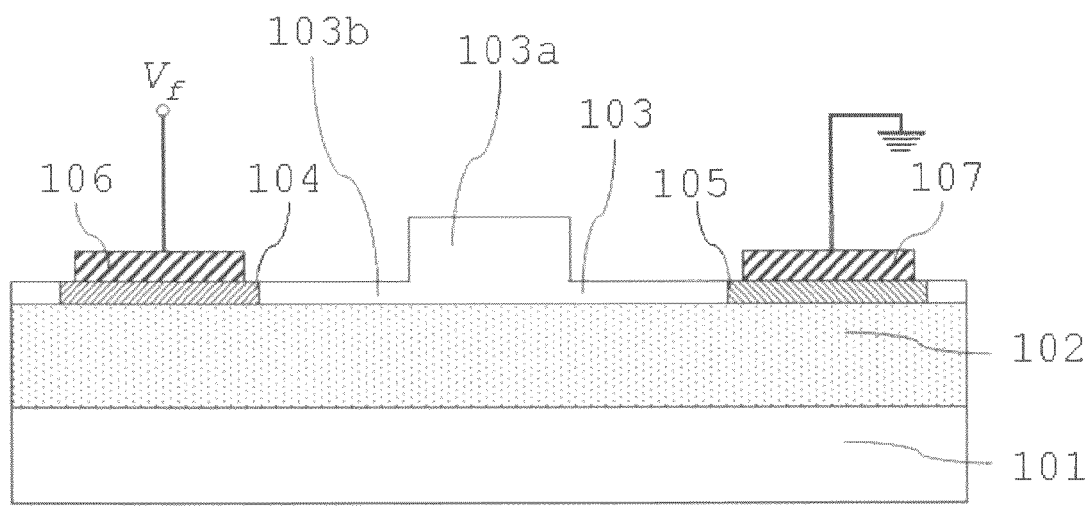
FIG. 11 is a schematic view showing the cross-section structure of a phase modulator unit of an optical modulation device of a Mach-Zehnder interferometer type according to a related art.

FIG. 11 is a schematic view showing the cross-section structure of a phase modulator unit of an optical modulation device of a Mach-Zehnder interferometer type according to a related art. There are some deformations in the drawings for ease of explanation, and therefore, the sizes of the respective parts and the aspect ratios differ from those of actual devices. The same applies to the other drawings, though not particularly specified.

This optical phase modulator is formed with the use of a SOI substrate consisting of a Si substrate 101, a SiO$_2$ film (a BOX layer) 102 of 3 μm in thickness, and an i-Si layer 103 (of the p-type and with an acceptor density lower than $1 \times 10^{16}$ cm$^{-3}$). The i-Si layer 103 is designed to have a mesa portion 103a of 450 nm in width and 220 nm in thickness, and the other portion as a slab layer 103b of 50 nm in thickness. Light is propagated through the so-called rib optical waveguide structure.

At locations in the slab layer 103b that are 500 nm away from the waveguide mesa 103a, a p$^+$-region 104 and an n$^+$-region 105 are formed by ion implantation and annealing. At locations on the p$^+$-region 104 and the n$^+$-region 105 that are 750 nm away from the optical waveguide mesa 103a, ohmic electrodes 106 and 107 are formed, respectively. The reason that the electrodes 106 and 107 and the high-density regions 104 and 105 are at distances from the optical waveguide mesa 103a is to reduce influence of absorption of light being propagated through the waveguide by the electrodes and free carrier absorption.

When the carrier density in the i-Si layer 103 is made higher by applying a forward bias $V_f$ to the pin diode structure, the refractive index becomes lower according to Mathematical Formula 1, and accordingly, phase modulation is performed. If the carrier density is made too high, the loss due to free carrier absorption also increases. Therefore, the carrier density is preferably up to approximately $3 \times 10^{18}$ cm$^{-3}$. According to Mathematical Formula 1, where both the electron density and the hole density vary by $1.5 \times 10^{18}$ cm$^{-3}$, the refractive index variation Δn is $-7.78 \times 10^{-3}$.

Figure 2:
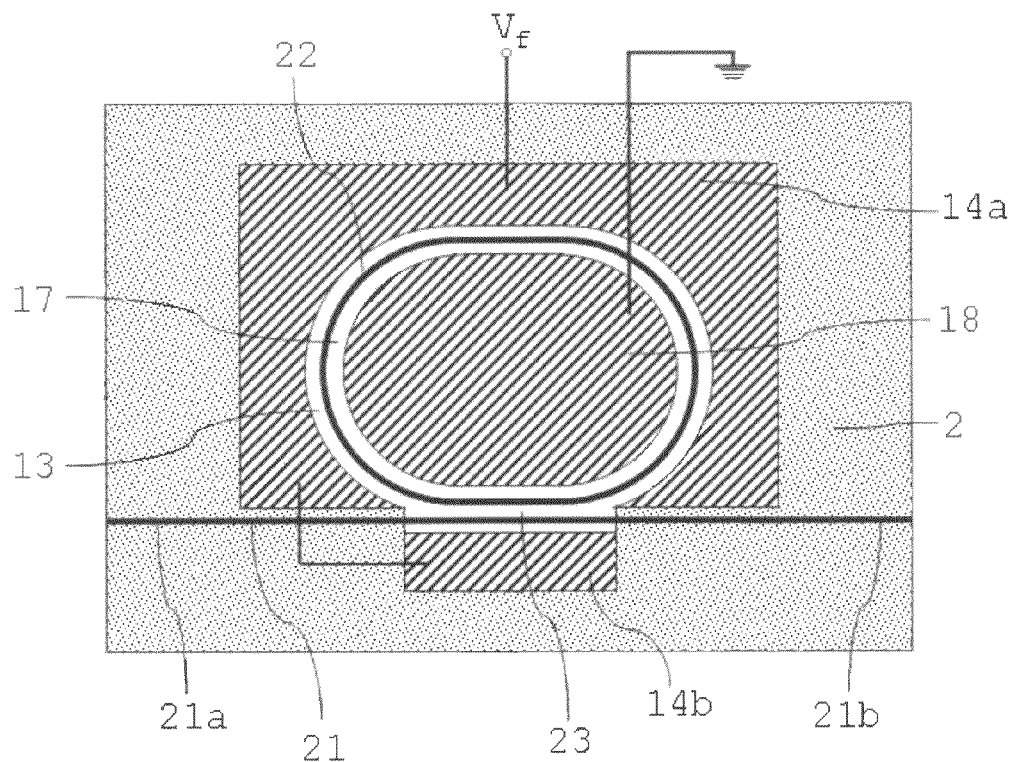
FIG. 2 is a schematic view showing the planar arrangement of the optical modulation device (an optical modulation device of a racetrack resonator type)
Figure 7:
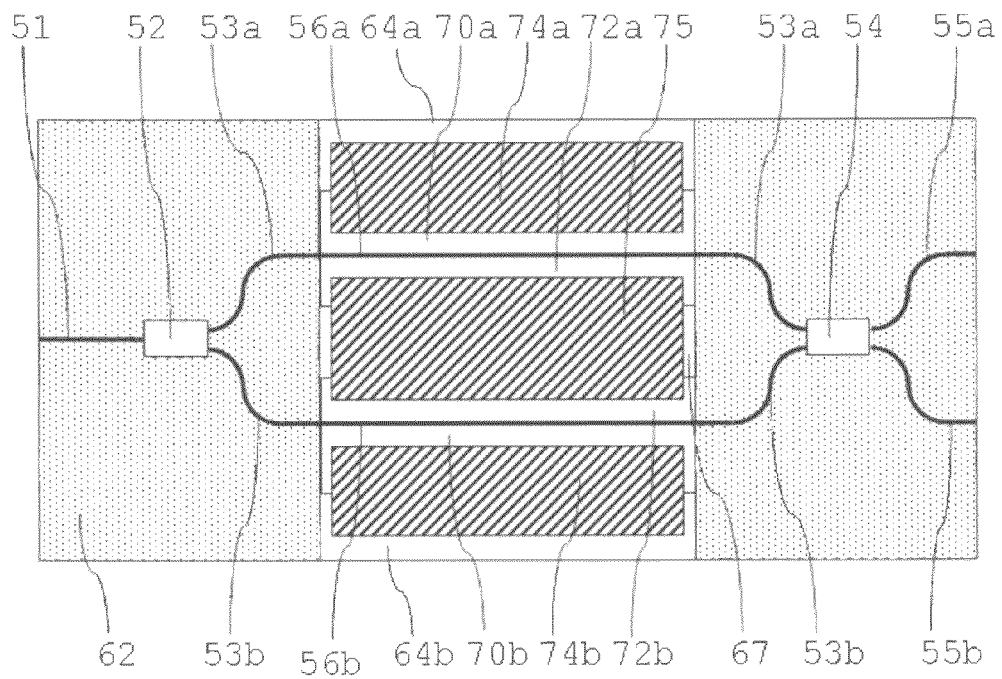
FIG. 7 is a plan view showing the planar arrangement of an optical modulation device (an optical modulator of a Mach-Zehnder interferometer type) according to a second embodiment.

By incorporating such a phase modulator into a Mach-Zehnder interferometer shown in FIG. 7 or a microring resonator (a racetrack resonator) shown in FIG. 2, an optical intensity modulator can be realized. In a hypothetical case of a Mach-Zehnder interferometer having a wavelength λ of 1.55 μm, a phase modulator length l of 100 μm, and an optical confinement factor Γ of 1, the phase shift amount Δϕ is $2\pi l \Gamma \Delta n/\lambda = -3.15 \sim -\pi$. Accordingly, the maximum state and the minimum state of the outputs can be reversed. If the carrier lifetime is 300 picoseconds, a modulation current of approximately 22 mA is necessary.

Figure 12:
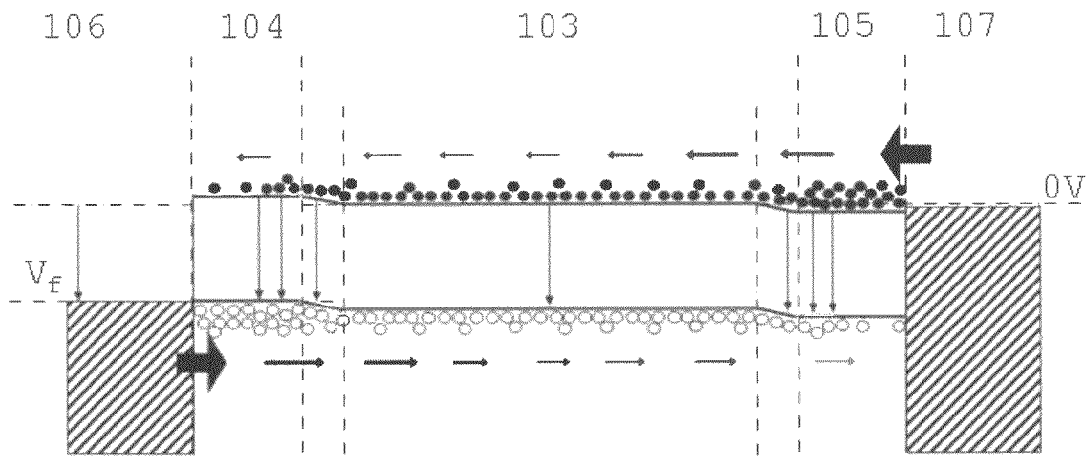
FIG. 12 is a diagram for explaining the band structure of the relevant parts in the phase modulator unit of an optical modulation device of a Mach-Zehnder interferometer type according to a related art.

The problem with the carrier-injection-type optical modulator having a pin diode structure is its fast response characteristics. FIG. 12 is a schematic view for explaining the band structure of the relevant parts in the phase modulator unit of an optical modulation device of a Mach-Zehnder interferometer type according to a related art. The applied voltage is approximately 1 V, so that the carrier density in the i-Si layer 103 becomes $(1 \text{ to } 3) \times 10^{18}$ cm$^{-3}$. To satisfy the electroneutrality conditions, the carriers are almost uniformly distributed in the i-Si region 103, and the internal electric field is extremely small. The carrier lifetime in the i-Si region 103 having a low impurity density is long (several tens of nanoseconds when no carriers are being injected, and several hundreds of picoseconds when a large amount of carriers are being injected), and the minority carrier lifetimes in the high-density regions (the donor/acceptor densities being up to $10^{20}$ cm$^{-3}$) 104 and 105 are on the order of several hundreds of picoseconds. The i-Si region 103 functions as a carrier reservoir that is in equilibrium with the high-density regions 104 and 105. Since the electric field is small, the diffusion current components are dominant over drift currents in most regions.

In a case where the applied voltage is slightly changed, the deviation from the equilibrium with the high-density regions 104 and 105 turns into the drive force to cause a change in the carrier density in the i-Si region 103, and therefore, the response speed depends on the minority carrier lifetimes (several tens of picoseconds to several hundreds of picoseconds) in the high-density regions. Also, since the width of the i-Si region 103 is nearly 1.5 μm, a considerably long period of time is required for the internal carrier distribution to become uniform. Therefore, the 3 dB cutoff frequency of the small-signal frequency response remains 520 MHz (as indicated by the dotted line in FIG. 5).

The diffusion capacitance of a diode is the amount equivalent to the product of the carrier lifetime and the diffusion admittance. The diffusion admittance of the pin diode assumed herein is on the order of 1 S, and therefore, the diffusion capacitance is on the order of several hundreds of pF. On the other hand, the parasitic capacitance of an electrode is 1 pF or lower, and the CR time constant in accordance with the parasitic capacitance is not a dominant speed limiting factor.

Figure 13A:
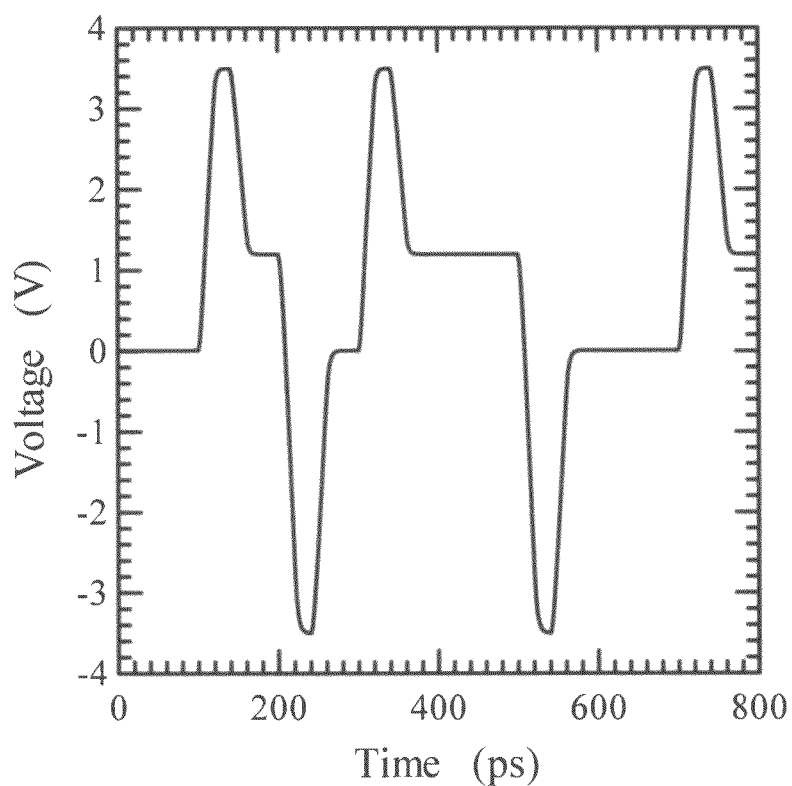
FIG. 13A is a graph showing the drive waveform for performing 10 Gbps modulation by the optical modulation device of a Mach-Zehnder interferometer type according to the related art.
Figure 13B:
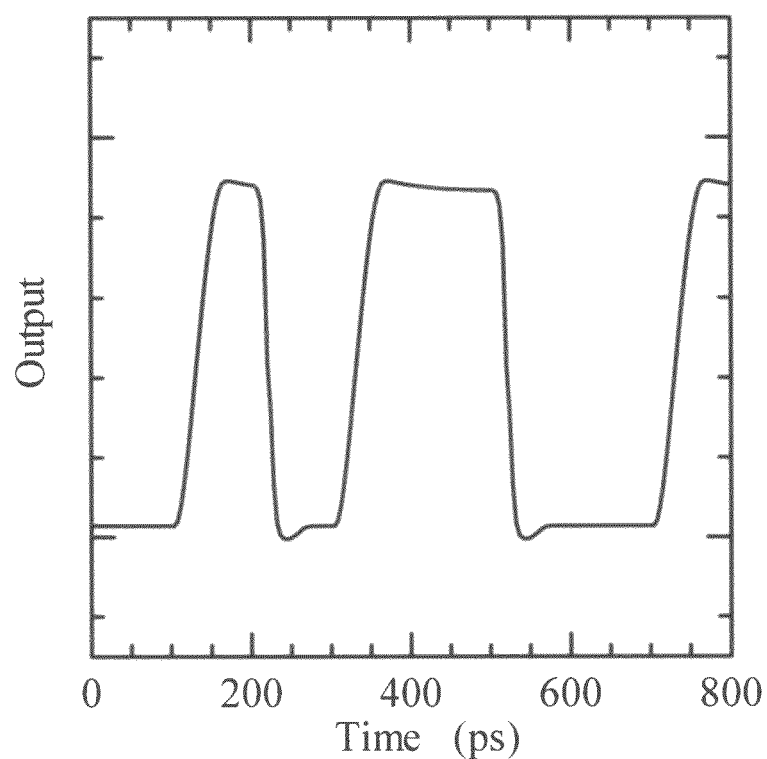
FIG. 13B is a graph showing the output waveform of light modulated at 10 Gbps by the optical modulation device of a Mach-Zehnder interferometer type according to the related art.

A method of applying large preemphasis has been known as a method of driving a carrier-injection type Si optical modulator of a pin diode structure having slow response characteristics as above at a high speed on the order of 10 Gbps. For example, the differentiated waveform of an original 10 Gbps drive waveform is amplified and overlapped on the original drive waveform. In this manner, a drive waveform having preemphasis as shown in FIG. 13A can be produced. Since an extremely large electric field is generated in the i-Si region 103 by the preemphasis at the time of switching on and off, the carrier injection and discharge between the i-Si layer 103 and the high-density regions 104 and 105 are accelerated by the drift, and a fast response output waveform as shown in FIG. 13B is obtained. If preemphasis is not applied, there will be no responses to 10-Gbps modulation signals, since the rise time and the fall time are long.

Based on the above findings, a technique for realizing a Si optical modulator has been developed. This Si optical modulator can perform sufficient optical modulation with a low-voltage CMOS drive force even at several Gbps to several tens of Gbps. This Si optical modulator forms an optical modulation device that at least includes: a first p-type semiconductor region; a first n-type semiconductor region; a first low-impurity-density semiconductor region formed between the first p-type semiconductor region and the first n-type semiconductor region; a second n-type semiconductor region formed on an outer side of the first p-type semiconductor region via a second low-impurity-density semiconductor region; and a second p-type semiconductor region formed on an outer side of the first n-type semiconductor region via a third low-impurity-density semiconductor region. The carrier density in the first low-impurity-density semiconductor region is changed by current injection, and the phase of light propagated through an optical waveguide structure that includes at least part of the first low-impurity-density semiconductor region is modulated.

The following is a more detailed description of the embodiments.

(First Embodiment)

FIG. 1 schematically shows a vertical cross-section structure of an optical modulation device (an optical modulator of a racetrack resonator type) of a first embodiment.

The optical modulation device of the first embodiment is formed on a SiO$_2$ film 2 that is formed on a Si substrate 1 and has a thickness of approximately 3 μm. The phase modulator includes a 30-nm thick n-type amorphous (a-) Si layer 3 (the second n-type semiconductor region), a 20-nm thick undoped (i-) a-Si layer 4 (the second low-impurity-density semiconductor region), a 30-nm thick p-type a-Si layer 5 (the first p-type semiconductor region), a 70-nm thick undoped a-Si layer 6 (the first low-impurity-density semiconductor region), a 30-nm thick n-type a-Si layer 7 (the first n-type semiconductor region), a 20-nm thick undoped a-Si layer 8 (the third low-impurity-density semiconductor region), and a 30-nm thick p-type a-Si layer 9 (the third p-type semiconductor region) in this order from the bottom. The entire stack structure of 230 nm in total thickness is processed into a mesa shape of approximately 450 nm in width, and forms the core 10 of an optical waveguide.

At one side of the optical waveguide core 10, an n$^+$-type poly Si layer 11 is formed so as to be in contact with the n-type a-Si layer 3, and a p$^+$-type poly Si layer 13 is formed on the n$^+$-type poly Si layer 11 so as to be in contact with the p-type a-Si layer 5, with a SiO$_2$ layer 12 being sandwiched between the n$^+$-type poly Si layer 11 and the p$^+$-type poly Si layer 13. The n$^+$-type poly Si layer 11 and the p$^+$-type poly Si layer 13 are electrically connected by an ohmic electrode 14.

At the other side of the optical waveguide core 10, SiO$_2$ is deposited almost as high as the undoped a-Si layer 6, so as to be integrated with the SiO$_2$ film 2 of the base layer. An n$^+$-type poly Si layer 15 is formed on the deposited SiO$_2$ so as to be in contact with the n-type a-Si layer 7, and a p$^+$-type poly Si layer 17 is formed so as to be in contact with the p-type a-Si layer 9, with a SiO$_2$ layer 16 being sandwiched between the n$^+$-type poly Si layer 15 and the p$^+$-type poly Si layer 17. The n$^+$-type poly Si layer 15 and the p$^+$-type poly Si layer 17 are electrically connected by an ohmic electrode 18.

The conductivity type of each of the undoped layers 4, 6, and 8 may be either the p-type or the n-type, but the impurity densities in those layers are substantially restricted to $10^{16}$ cm$^{-3}$ or lower. The donor density in each n-type a-Si layer is set at $3\times10^{17}$ cm$^{-3}$, and the acceptor density in each p-type a-Si layer is set at $3\times10^{17}$ cm$^{-3}$. The donor densities in the n$^+$-type poly Si layers 11 and 15, and the acceptor densities in the p$^+$-type poly Si layers 13 and 17 are approximately $1\times10^{18}$ cm$^{-3}$ on the optical waveguide side, and approximately $1\times10^{20}$ cm$^{-3}$ under the electrodes.

Ti silicide is formed in the vicinities of the Si layers 11, 13, 15, and 17, and the electrodes 14 and 18. An interconnect metal containing Au as the main component is stacked on the Ti silicide of each of the electrode 14 and 18. Since the electrodes 14 and 18 are at a distance of approximately 750 nm from the optical waveguide core 10, optical waveguide loss due to the electrodes is small.

FIG. 2 is a plan view for schematically showing the structure of the optical modulation device (the optical modulator of a racetrack resonator type) of the first embodiment. This optical modulator of a racetrack resonator type is formed on the SiO$_2$ film 2, and a linear optical waveguide 21 and a racetrack resonator 22 of 5 μm in radius of each curved portion are coupled to each other by a linear directional coupler 23.

The input portion 21a and the output portion 21b of the linear optical waveguide 21 are formed by passive optical waveguides each having a core made of undoped a-Si of 230 nm in thickness and 450 nm in width. The cross-section structure of the racetrack resonator 22 is as shown in FIG. 1. The $n^+$-type poly Si layer 15, the $SiO_2$ film 16, and the $p^+$-type poly Si layer 17 are formed inside the racetrack resonator 22, and the ohmic electrode 18 formed on the $n^+$-type poly Si layer 15 and the $p^+$-type poly Si layer 17 is grounded. The $n^+$-type poly Si layer 11, the $SiO_2$ film 12, and the $p^+$-type poly Si layer 13 are formed outside the racetrack resonator 22, and a forward bias voltage $V_f$ is applied thereto via an ohmic electrode 14a formed on the $n^+$-type poly Si layer 11 and the $p^-$-type poly Si layer 13. The vicinity of the directional coupler 23 of the linear optical waveguide 21 has a cross-section structure in which the $n^+$-type poly Si layer 11, the $SiO_2$ film 12, and the $p^+$-type poly Si layer 13 are stacked on either side of the optical waveguide core 10 in FIG. 1, and the n-type a-Si layer 7 and the p-type a-Si layer 9 are used in an electrically floating state. In this region, an ohmic electrode 14b is placed outside the linear optical waveguide 21, and is electrically connected to the ohmic electrode 14a.

Of the light entering through the input portion 21a of the linear optical waveguide 21, the light of resonant wavelengths is trapped by the racetrack resonator 22, and attenuates due to radiation loss while circling around the resonator 22. As a result, the light of resonant wavelengths is lost, and the light of non-resonant wavelengths is output through the output portion 21b of the linear optical waveguide 21. If the coupling factor of the directional coupler 23 is optimized to satisfy the so-called critical coupling conditions during an unmodulating period, the contrast ratio between the resonant wavelength and the non-resonant wavelength can be made larger. This optical modulator of a racetrack resonator type forms part of an optical integrated circuit with other optical waveguides and optical devices (such as a light receiving device, a wavelength filter, and other optical control devices) formed on the same Si substrate 1 via the $SiO_2$ film 2.

In the racetrack resonator 22, when a forward bias voltage is applied and a current is injected between the ohmic electrode 18 formed on the $n^+$-type poly Si layer 15 and the $p^+$-type poly Si layer 17 and the ohmic electrode 14 formed on the $n^+$-type poly Si layer 11 and the $p^+$-type poly Si layer 13, the carrier density in the core region of the racetrack resonator 22 (the phase modulator) becomes higher, and the refraction index becomes lower due to the carrier-plasma effect expressed by the Mathematical Formula (1). As a result, the phase of the light propagated through the racetrack optical resonator 22 is modulated, and the resonant frequency changes.

Figure 3:
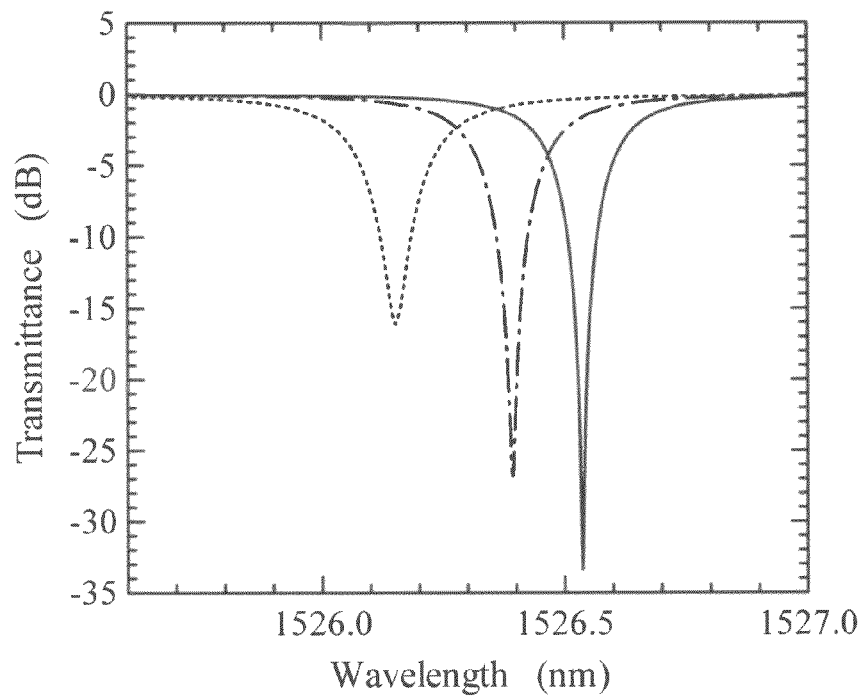
FIG. 3 is a graph for explaining the relationship between the carrier density in the relevant part of the phase modulator unit of the optical modulation device (the optical modulation device of a racetrack resonator type) and the transmission spectrum according to the first embodiment.

FIG. 3 shows the variation of the transmission spectrum of the output portion 21b of the linear optical waveguide 21 seen when carriers are injected thereinto. The solid line represents the output spectrum observed when carriers are not injected, the dot-and-dash line represents a case where the effective carrier density variation obtained by weighted averaging with an optical power distribution in the optical waveguide is $1 \times 10^{17} cm^{-3}$, and the dotted line represents a case where the effective carrier density variation is $3 \times 10^{17} cm^{-3}$. Since the dips of the transmission spectrums are steep, a sufficiently high extinction ratio can be achieved with a much smaller carrier density variation than that used in the case of an optical modulator of a Mach-Zehnder interferometer type. The following description concerns a case where optical intensity modulation is performed, with the incident wavelength being set around 1526.53 nm, and the effective carrier density being varied by $1 \times 10^{17} cm^{-3}$. The bandwidth in which transmitted light has a loss of 10 dB during an unmodulating period is approximately 10 GHz.

Figure 4:
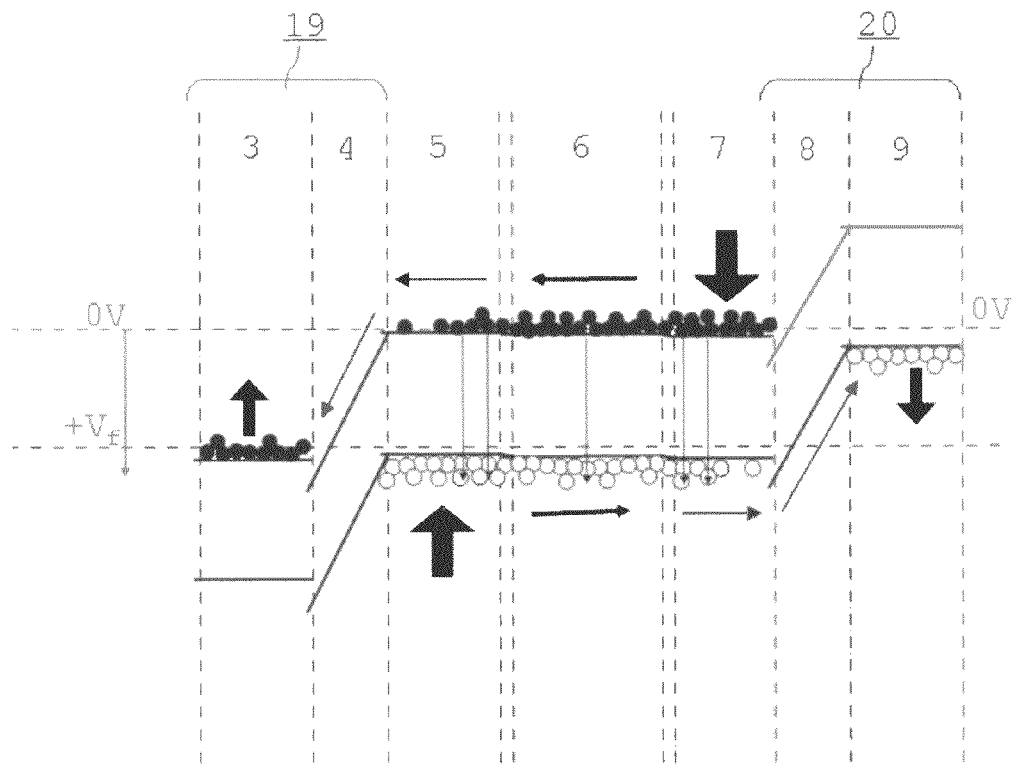
FIG. 4 is a diagram for explaining the band structure of the relevant part of the phase modulator unit of the optical modulation device according to the first embodiment.

FIG. 4 is a diagram schematically showing the band structure of the relevant part of the phase modulator of the optical modulation device of the first embodiment. Since the optical modulation device is used in a region where the carrier density in the i-Si layer 6 is $3 \times 10^{17} cm^{-3}$, which is almost the same as the majority carrier densities in the p-Si layer 5 and the n-Si layer 7, the bands of the main pin-diode are substantially aligned horizontally.

The p-Si layer 5 and the n-Si layer 3 are maintained at the same potential via the $p^+$-Si layer 11, the electrode 14, and the $n^+$-Si layer 13, a built-in field (up to 500 kV/cm) is generated in the i-Si layer 4 (20 nm in thickness) in between by a diffusion potential difference (up to 1 V). With this electric field, the interface between the i-Si layer 4 and the p-Si layer 5 serves as an inlet for electrons injected into the p-Si layer 5. That is, the i-Si layer 4 and the n-Si layer 3 serve as a drain 19 for electrons injected from the i-Si layer 6 into the p-Si layer 5. Likewise, the i-Si layer 8 and the p-Si layer 9 serve as a drain 20 for holes injected from the i-Si layer 6 into the n-Si layer 7. It is safe to say that the phase modulator of this embodiment is a phase modulator in which the drain 19 for electrons and the drain 20 for holes are attached to the exterior of the main diode (5, 6, and 7) having a vertical pin structure.

Figure 10:
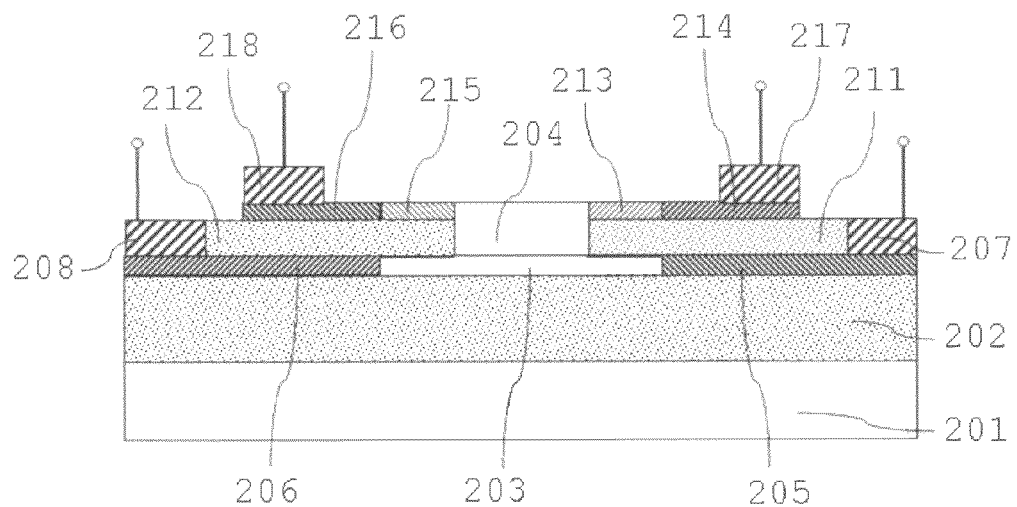
FIG. 10 is a schematic view showing the cross-section structures of phase modulators of an optical modulation device (an optical modulator of a Mach-Zehnder interferometer type) according to a third embodiment.

Because of the vertical pin structure with a 70-nm thick i-Si layer, the response speed of the i-Si layer 6 is higher than that of the horizontal pin diode (the width of an i-layer being 1 μm or greater) of the related art (FIGS. 10 and 11). However, the impurity densities in the p-Si layer 5 and the n-Si layer 7 are on the order of $10^{17} cm^{-3}$, and the carrier lifetime is on the order of several nanoseconds. The lifetime of the minority carriers in the $p^+$-Si region 11 and the $n^+$-Si region 15 in the vicinities of the electrodes is on the order of 100 picoseconds. However, with the electron transportation from the p-region 5 to the $p^+$-region 11 and the hole transportation from the n-region 7 to the $n^+$-region 15 being taken into consideration, the cutoff frequency in a hypothetical case where the drains 19 and 20 do not exist is limited up to the order of 100 MHz.

In this embodiment, the electrons injected from the i-Si layer 6 into the p-Si layer 5 are partially recombined with holes in the p-Si layer 5 or the $p^+$-Si layer 13, but most of the electrons are drawn toward the drain 19 and are discharged via the n-Si layer 3, the $n^+$-Si layer 11, and the electrode 14. Likewise, the holes injected from the i-Si layer 6 into the n-Si layer 7 are partly recombined with electrons in the n-Si layer 7 or the $n^+$-Si layer 15, but most of the holes are accelerated by the drain 20 and are discharged through the p-Si layer 9, the $p^+$-Si layer 17, and the electrode 18.

When the concentration gradient of the electrons in the p-Si layer 5 is subjected to linear approximation, the time $\tau_t$ required for the electrons to travel through the p-Si layer 5 having a thickness Wp can be estimated by Mathematical Formula 2. Here, $D_e$ represents the diffusion coefficient of the electrons in the p-region, and the following equation is established according to Einstein's relationship: $D=\mu kT/q$, where q represents the elementary charge of the electrons, μe represents the mobility of the electrons, k represents the Boltzmann constant, and T represents the absolute temperature.

$$\tau_t = Wp^2/(2D_e) = qWp^2/(2\mu_e kT) \qquad \text{Mathematical Formula 2}$$

Likewise, the hole travel time in the n-Si layer 7 is expressed by Mathematical Formula 3. Here, Wn represents the thickness of the n-Si layer 7, and $\mu_h$ represents the mobility of the holes.

$$\tau_t = qWn^2/(2\mu_h kT) \qquad \text{Mathematical Formula 3}$$

If the temperature dependence is ignored, the mobility in the Si is turned into a model by Mathematical Formula 4.

$$\mu = \left[\frac{\mu_{max} - \mu_{min}}{1 + \left(\frac{|N_{dop}|}{N_{ref}}\right)^\alpha + f} + \mu_{min}\right]\left[\frac{1}{1 + \left(\frac{E}{E_c}\right)^\beta}\right]^{1/\beta} \qquad \text{Mathematical Formula 4}$$

Here, E represents the field intensity, and f in the formula satisfies the following Mathematical Formula 5.

$$f = \left[\frac{(pn)^{1/2}}{2.04 N_{ref}}\right]^\alpha \qquad \text{Mathematical Formula 5}$$

Although there are various models for the mobility parameters of Si, the values shown in table 1 are hypothetically used herein.

TABLE 1

|  | $\mu_p$ | $\mu_n$ |
|---|---|---|
| $N_{ref}$ (cm$^{-3}$) | $6.3*10^{16}$ | $8.5*10^{16}$ |
| α | 0.76 | 0.72 |
| $\mu_{max}$ (cm$^2$/V/s) | 495 | 1334 |
| $\mu_{max}$ (cm$^2$/V/s) | 47.7 | 65 |
| $E_c$ (V/cm) | $1.95*10^4$ | $8*10^3$ |
| β | 1 | 2 |

Since the electric fields in the p-Si layer 5 and the n-Si layer 7 can be ignored, the mobilities of the electrons and the holes can be estimated to be $\mu_e=338$ cm$^2$/V/s and $\mu_h=126$ cm$^2$/V/s according to Mathematical Formulas 4 and 5, if the impurity densities are hypothetically set as $N_{dop}=3\times10^{17}$ cm$^{-3}$ and $(pn)^{1/2}=(N_{dop}^2/2)1/2$. When those values are assigned to Mathematical Formulas 2 and 3, the electron travel time in the p-Si layer 5 is estimated to be 0.5 picoseconds, and the hole travel time in the n-Si layer 7 is estimated to be 1.4 picoseconds. That is, because of the existence of the drains 19 and 20, the effective minority carrier lifetime is shortened to approximately 1 picosecond. Even if the influence of the carrier transportation in the i-Si layer 6 having a thickness of 70 nm is taken into consideration, the response time constant is around 5 picoseconds (the cutoff frequency being up to 30 GHz).

Figure 5:
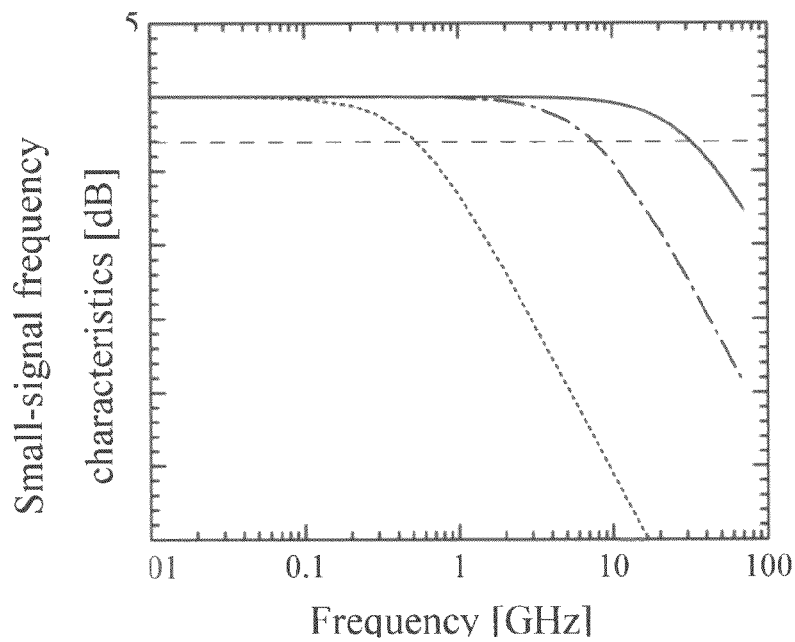
FIG. 5 is a graph showing comparisons in small-signal frequency characteristics between the optical modulation device of this embodiment and an optical modulation device according to a related art.

FIG. 5 shows a comparison in the small-signal frequency response characteristics between the optical modulation device of this embodiment and the optical modulator of the Mach-Zehnder interferometer type of the related art. The solid line represents the response of the optical modulation device (the optical modulator of the racetrack resonator type) of the first embodiment, the dot-and-dash line represents the response of an optical modulator of a Mach-Zehnder interferometer type according to the later described second embodiment, and the dotted line represents the response of the optical modulator of the Mach-Zehnder interferometer type of the related art. The −3 dB cutoff frequencies are 32 GHz, 7.5 GHz, and 520 MHz, respectively. With the use of the optical modulation device of the first embodiment, operations can be performed at a speed 60 times higher than that by the optical modulator of the related art. Although only the electric frequency responses are described herein, a cutoff band limitation with the transmission spectrum (the 10 dB cutoff bandwidth being up to 10 GHz) is also imposed on the racetrack resonator of the first embodiment. Therefore, at 10 GHz or higher, the decrease in the extinction ratio becomes larger as the frequency becomes higher.

Since there is the relationship expressed by Mathematical Formula 6 between the carrier density N and the current I of an optical modulator, the current density required to obtain the same carrier density variation ΔN becomes higher in the optical modulator of this embodiment that has a short effective carrier lifetime τ. Here, V represents the volume of the portion having the carrier density variation. However, this embodiment is an optical modulator of a microring resonator type, and the carrier density variation required to achieve sufficient modulation is approximately $1\times10^{17}$ cm$^{-3}$, which is 1/30 of that of the optical modulator of the Mach-Zehnder interferometer type of the related art. The volume V (70 nm in thickness×450 nm in width×approximately 40 μm in boundary length) of the i-Si layer 6 is ten or more times smaller than the volume of the i-Si region 103 of the optical modulator of the Mach-Zehnder interferometer of the related art. Accordingly, if the optical confinement factor of the i-Si region 103 is 30%, the current amplitude becomes 24 mA, which is substantially the same as that in the case of the DC driving of the optical modulator of the related art.

$$I = \frac{qVN}{\tau} \qquad \text{Mathematical Formula 6}$$

Figure 6:
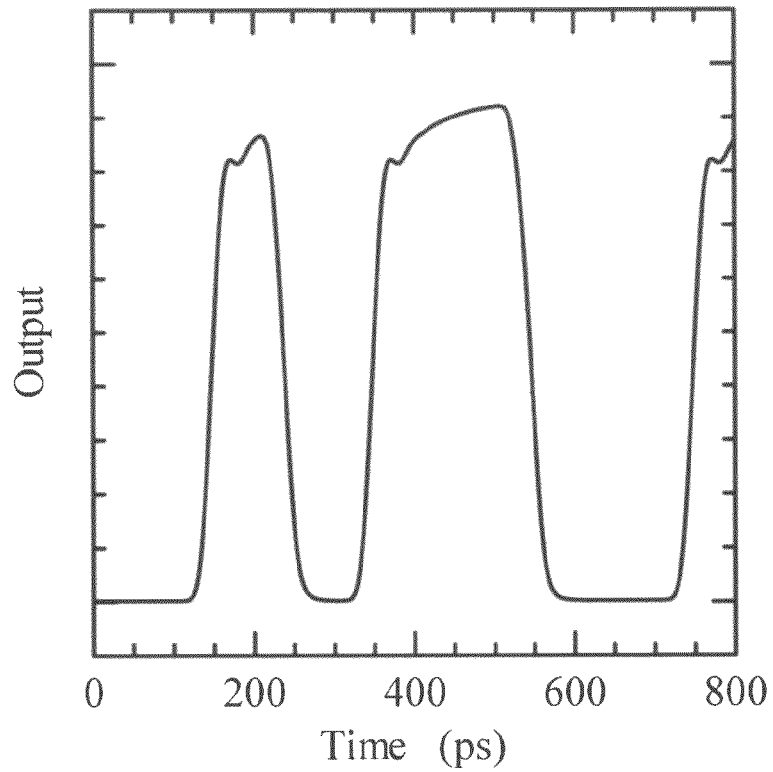
FIG. 6 is a graph showing the drive waveform and the optical waveform at 10 Gbps in the optical modulation device of this embodiment.

FIG. 6 shows an example of the output waveform of the optical modulator of this embodiment. The optical modulator of the related art shown in FIG. 11 cannot perform high-speed modulation without a large pre-emphasis. On the other hand, the optical modulator of this embodiment can perform 10 Gbps modulation with substantially the same modulation amplitude as DC. If a small increase in drive current amplitude and a decrease in extinction ratio are allowed, the optical modulator of this embodiment can operate at 20 Gbps. In principle, by reducing the radius of the ring resonator and increasing the spectrum bandwidth, the ring resonator can operate at 40 Gbps.

However, the diffusion capacitance of the optical modulator of this embodiment is small. Therefore, depending on the arrangement of the interconnects and electrodes, the parasitic capacitance components of the interconnects and electrodes might become the cause of the limitation on speed. Attention also needs to be paid to this aspect when a high-speed operation is performed.

Since the current becomes high for the device size, series resistance components such as the contact resistance of the electrodes and the termination resistance are preferably minimized so as not to allow the drive voltage to become higher.

As the optical modulator of this embodiment does not use a SOI substrate, the optical modulator can be integrally stacked on a drive high-speed CMOS circuit. As the optical modulator of this embodiment is small in size, a close-integrated drive circuit connected directly to the electrodes of the optical modulator of this embodiment by via interconnects can be regarded as a lumped constant circuit even at 40 Gbps, and there is no need to provide a termination resistance in series for impedance matching. Accordingly, there is no drive voltage increases due to a termination resistance, and the power consumption can be greatly reduced.

It should be noted that the a-Si portion of this embodiment may be (partially or entirely) replaced with poly Si or crystalline Si, or the poly Si portion may be (partially or entirely) replaced with crystalline Si or a-Si. Also, part of or all of the Si portion may be replaced with SiGe, SiC, or the like. The upper portion or the peripheries of the optical waveguide may be covered with an insulating film, or part of or all of the $SiO_2$ may be replaced with some other insulating film such as a SiN film, a SiON film, or a $TiO_2$ film. Since an optical modulator of a microring resonator type is extremely sensitive to temperature variations, a material having a refractive index with a negative temperature coefficient is preferably used as the cladding layer, instead of $SiO_2$, if possible, so as to reduce the temperature dependence.

Although the conductivity type of the lowermost layer in this embodiment is the n-type, the p-type and n-type order may be changed to p-i-n-i-p-n from the bottom. The impurity density distributions in the p-regions and the n-regions, and the impurity distribution profiles in the boundaries with the i-regions can be changed in various manners as needed.

In the above described first embodiment, the p-Si layer 5 and the n-Si layer 3 are connected by the electrode 14, and the n-Si layer 7 and the p-Si layer 9 are connected by the electrode 18. Therefore, a two-terminal device is formed. This embodiment is not necessarily a two-terminal device. The voltages to be applied to the p-Si layer 5, the n-Si layer 3, the n-Si layer 7, and the p-Si layer 9 may be changed independently of one another. In this manner, new functions can be added.

For example, a forward bias that does not turn on the diode maybe applied between the p-Si layer 5 and the n-Si layer 3 and between the n-Si layer 7 and the p-Si layer 9. By doing so, the effect of the minority carriers as the drain can be reduced, and the effective carrier lifetime can be extended. By controlling the effective carrier lifetime to a value corresponding to the transmission data rate, unnecessarily large increases in modulation current and power consumption can be restrained.

Further, if the voltages to be applied between the p-Si layer 5 and the n-Si layer 3 and between the n-Si layer 7 and the p-Si layer 9 are made variable, the effective minority carrier lifetime can be adjusted. By applying voltages of values programmed beforehand in accordance with the voltage to be applied to the main diode, the trade-off between the high speed and the power consumption may be maintained in an optimum state. Further, when the amount of data to be transmitted is small, the carrier lifetime may be made longer, and data transmission may be performed at a low data rate, to restrain power consumption. When the amount of data to be transmitted is large, the carrier lifetime may be made shorter, and high-speed modulation may be performed.

Alternatively, fixed voltages may be applied to the n-Si layer 3 and the p-Si layer 9, and the voltages to be applied to the p-Si layer 5 and the n-Si layer 7 may be subjected to high-speed modulation. For example, a fixed voltage of +0.6 V is applied to the n-Si layer 3, and a fixed voltage of −0.6 V is applied to the p-Si layer 9. The voltages to be applied to the p-Si layer 5 and the n-Si layer 7 are respectively adjusted to +0.6 V and −0.6 V in an On state, and are respectively adjusted to +0.4 V and −0.4 V in an Off state. In this structure, the voltages to be applied to the two outside auxiliary pin diodes vary in the range of 0 to −0.2 V through modulated voltage application. However, the function as the drain for the minority carriers is exactly the same as that in the first embodiment, and the optical modulation device can be driven at a low voltage and a high speed.

(Second Embodiment)

FIG. 7 is a plan view schematically showing the structure of an optical modulation device (an optical modulator of a symmetrical Mach-Zehnder interferometer type) of a second embodiment. This Mach-Zehnder interferometer includes an input optical waveguide 51, a 1×2 optical coupler 52 of a multimode interferometer (MMI) type, a first branch 53a, a second branch 53b, a 2×2 optical coupler 54 of a multimode interferometer (MMI) type, and output optical waveguides 55a and 55b. This Mach-Zehnder interferometer form part of an optical integrated circuit with other optical waveguides and optical devices.

Among those components, part (about 100 µm in length) of the first branch 53a and part of the second branch 53b are a first phase modulator 56a and a second phase modulator 56b, respectively. The rest of the optical waveguide is an undoped a-Si passive optical waveguide of 220 nm in thickness and 450 nm in width.

Figure 8:
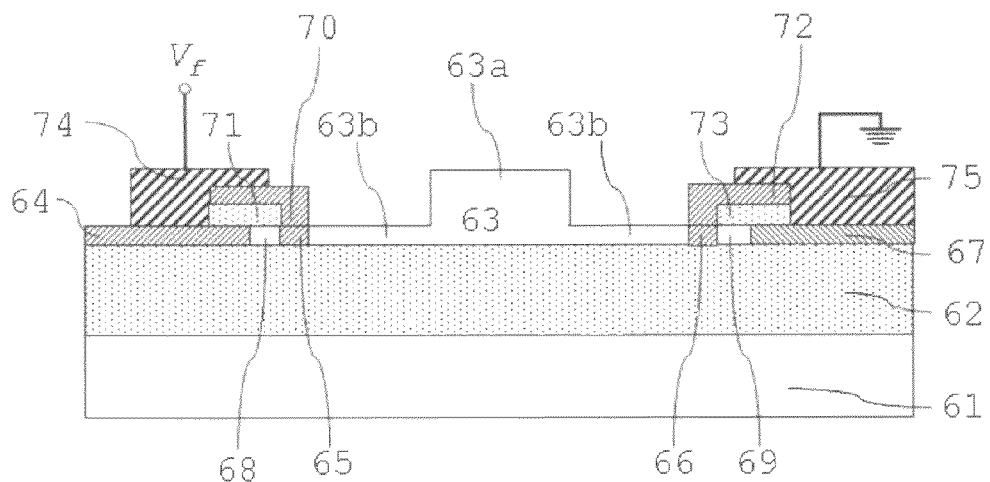
FIG. 8 is a schematic view showing the cross-section structures of the phase modulators of the optical modulation device (the optical modulator of a Mach-Zehnder interferometer type) according to the second embodiment.

FIG. 8 is a diagram for explaining the cross-section structures of the phase modulators 56a and 56b in the optical modulator of the symmetrical Mach-Zehnder interferometer. This optical phase modulator is formed with the use of a SOI substrate consisting of a Si substrate 61, a $SiO_2$ film (a BOX layer) 62 of 3 µm in thickness, and an i-Si layer 63 (of the p-type and with an acceptor density lower than $1\times10^{16}$ $cm^{-3}$). The i-Si layer 63 is designed to have a mesa portion 63a of 450 nm in width and 220 nm in thickness, and the other portion as a slab layer 63b of 50 nm in thickness. Guided light is propagated in this so-called rib optical waveguide structure.

In the slab layer 63b, an $n^+$-region 64, a p-region 65, an n-region 66, and a $p^+$-region 67 are formed by ion implantation and annealing. Undoped i-regions 68 and 69 each having a width of 100 nm remain between the $n^+$-region 64 and the p-region 65 and between the n-region 66 and the $p^+$-region 67, respectively. A $p^+$-poly Si film 70 is formed on and in contact with the p-region 65, and extends over the $SiO_2$ film 71. Also, an $n^+$-poly Si film 72 is formed on and in contact with the n-region 66, and extends over the $SiO_2$ film 73. An electrode 74 is formed on the $n^+$-region 64 and the $p^+$-poly Si film 70, and a ground electrode 75 is formed on the $p^+$-region 67 and the n+-poly Si film 72.

The distances between the optical waveguide mesa 63a and the p-region 65 and the n-region 66 are both 500 nm. The widths of the p-region 65 and the n-region 66 are both 100 nm. The distances between the optical waveguide mesa 63a and the electrodes 74 and 75 are 700 nm. The donor density in the $n^+$-region 64 is $1\times10^{20}$ $cm^{-3}$, the acceptor density in the p-region 65 is $3\times10^{18}$ $cm^{-3}$, the donor density in the n-region 66 is $3\times10^{18}$ $cm^{-3}$, and the acceptor density in the $p^+$-region 67 is $1\times10^{20}$ $cm^{-3}$. The majority carrier densities in the $n^+$-poly Si film 72 and the $p^+$-type poly Si film 70 are $5\times10^{19}$ $cm^{-3}$.

The ohmic electrode 75 formed on the $p^+$-region 67 and $n^+$-poly Si films 72a and 72b is a common electrode between the two phase modulators 56a and 56b, and is grounded. When a current is supplied through an ohmic electrode 74a formed on an $n^+$-region 64a and a $p^+$-type poly Si film 70a, the carrier density in the core region becomes higher, and the refractive index becomes lower due to the carrier-plasma effect expressed by Mathematical Formula 1. As a result, the phase of the light propagated through the first phase modulator 56a is modulated. Likewise, when a current is supplied through an ohmic electrode 74b formed on an $n^+$-region 64b and a $p^+$-type poly Si layer 70b, the phase of the light propagated through the second phase modulator 56b is modulated.

Light that enters the MMI coupler 52 through the input optical waveguide 51 is equally divided into two by the first branch 53a and the second branch 53b. After subjected to phase modulation at the phase modulators 56a and 56b, the light is output to the output optical waveguides 55a and 55b through the 2×2 MMI coupler 54. At this point, because of the interference of the light entering the MMI coupler 54 from the two branches 53a and 53b, the ratio of light to be output to the output optical waveguides 55a and 55b is changed.

Figure 9:
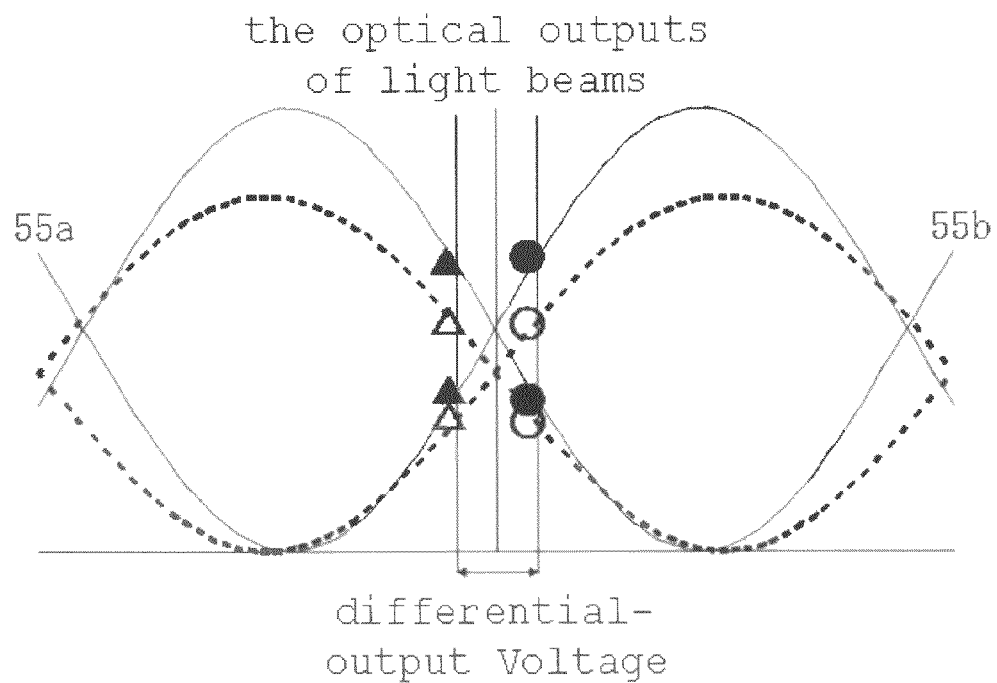
FIG. 9 is a diagram showing the relationship between the phase difference and the optical outputs of light beams input to a 2×2 MMI coupler of an optical modulation device (an optical modulation device of a Mach-Zehnder interferometer type) according to the second embodiment.

FIG. 9 shows the relationship between the phase difference of light beams entering the MMI coupler 54 from the two branches 53a and 53b and the optical powers that are output from the two output optical waveguides 55a and 55b. The solid lines represent the response characteristics at the time of initial setting, and the dotted lines represent the response characteristics observed when there is a change in temperature or wavelength. Even if the temperature or wavelength changes, the relation in intensity between the light rays output to the two output optical waveguides 55a and 55b is not reversed, because of the symmetric properties. Therefore, signal transmission can be performed even at an extinction ratio that is ten times lower than that in a case of single-end transmission. The carrier density variation here is approximately $1 \times 10^{17}$ cm$^{-3}$.

The optical phase modulator of the second embodiment has a structure in which an electron drain formed by the i-region 68 and the n$^+$-region 64 and a hole drain formed by the i-region 69 and the p$^+$-region 67 are added to the exterior of a horizontal pin diode similar to a conventional structure, and the operating principles of the optical phase modulator are substantially the same as those of the phase modulator of the first embodiment. However, the impurity densities in the p-region 65 and the n-region 66 are $3 \times 10^{18}$ cm$^{-3}$, and the widths of those regions are 100 nm. Accordingly, the minority carrier lifetimes in the p-region 65 and the n-region 66 are 15 picoseconds and 30 picoseconds, respectively. The small-signal frequency response characteristics of the optical modulator of the second embodiment are indicated by the dot-and-dash line in FIG. 5. The −3 dB cutoff frequency is 7.5 GHz, and the response speed is ten or more times higher than that of the conventional optical modulator (represented by the dotted line) of FIG. 11. By using this optical modulator, 10 Gbps operations can be performed without preemphasis.

By the differential optical transmission method used in this embodiment, the carrier density variation can be almost ten times smaller than that by the single-end transmission method of the related art. Accordingly, the optical modulator of this embodiment can be used with the same drive current as that for the conventional optical modulator, though the effective carrier lifetime of the optical modulator of this embodiment is ten times shorter than that of the optical modulator of the related art. If the drive current is the same, the drive voltage is also substantially the same. Therefore, the power consumption is reduced by the amount equivalent to the preemphasis.

The two branches of the Mach-Zehnder interferometer do not need to be symmetrical, and may form an asymmetrical structure having different optical path lengths. In that case, the outputs have wavelength dependence, but the two outputs can be balanced in terms of used wavelength by adjusting the phase biases through a temperature change in one of the branches with the use of a microheater or the like placed in the vicinity of the waveguide.

In the Mach-Zehnder interferometer of this embodiment, one of the phase modulators may be used for high-speed modulation of fixed biases, and the other one of the phase modulators may be used for bias adjustments (for feedback-controlling the operating points with respect to changes in wavelength, temperature, and the like, for example). In that case, the phase modulator for the bias adjustments not involving high-speed modulation may have a conventional pin diode structure. The electrode in the middle may be divided for the first branch and the second branch, or may not be grounded but be connected to the drive circuit.

Also, the optical modulation device of this embodiment is of a dual-output type, having the 2×2 MMI coupler 54 as the output optical coupler. However, if a 2×1 MMI coupler is used as the output optical coupler, the optical modulation device of this embodiment can be used as an optical intensity modulator of a single-output type. The optical modulation device of this embodiment can also be used as a high-speed On/Off optical switch (of a single-output type) or an optical branching switch (of a dual-output type). Other than that, various modifications and applications can be made without departing from the scope of this embodiment.

The above described first embodiment is an example case where a device of a stacked-layer type having a second n-type semiconductor region, a second low-impurity-density semiconductor region, a first p-type semiconductor region, a first low-impurity-density semiconductor region, a first n-type semiconductor region, a third low-impurity-density semiconductor region, and a second p-type semiconductor region stacked in this order on a Si substrate is applied to a racetrack resonator. The second embodiment is an example case where a device of a horizontal arrangement type having a second n-type semiconductor region, a second low-impurity-density semiconductor region, a first p-type semiconductor region, a first low-impurity-density semiconductor region, a first n-type semiconductor region, a third low-impurity-density semiconductor region, and a second p-type semiconductor region arranged on a SOI substrate is applied to an optical modulator of a Mach-Zehnder interferometer type. However, those combinations are not essential, and it is of course possible to form an optical modulator of a Mach-Zehnder interferometer type with a device of a stacked-layer type, and form a racetrack resonator with a device of a horizontal arrangement type.

It is also possible to form a mixed structure in which one of the drain for electrons and the drain for holes is of a stacked-layer type, and the other one is of a horizontal type.

As an optical modulator of a microring resonator type, only the first embodiment having a single input/output waveguide coupled to a single racetrack resonator has been described. However, it is possible to use a microring optical modulator of a dual-output type having a ring resonator interposed between two optical waveguides. In that case, the through output of the waveguide on the incident side and the dropped output of the waveguide on the opposite side are modulated in a complementary manner. Other than that, various modifications can be made, such as an optical modulator of a multi-ring resonator type having ring resonators connected to each other and an optical modulator having a ring resonator connected to an arm of a Mach-Zehnder interferometer.

(Third Embodiment)

FIG. 10 schematically shows the cross-section structures of the phase modulators of an optical modulation device (an optical modulator of a differential-output Mach-Zehnder interferometer type) according to a third embodiment.

This optical phase modulator is formed with the use of a SOI substrate consisting of a Si substrate 201, a SiO$_2$ film (a BOX layer) 202 of 3 μm in thickness, and an i-Si layer 203 (of the p-type and with an acceptor density lower than $1 \times 10^{16}$ cm$^{-3}$) of 50 nm in thickness. On the i-Si layer 203, an i-SiGe layer 204 having a width of 450 nm and a thickness of 70 nm is formed in a stripe state. An n$^+$-Si region 205 and a p$^+$-Si region 206 are formed at short distances from both sides of the i-SiGe layer 204 on the i-Si layer 203, and voltages can be applied from outside by an electrode 207 and an electrode 208, respectively.

An $SiO_2$ layer 211 is formed on the i-Si layer 203 and the $n^+$-Si layer 205 on one side of the i-SiGe layer 204, and a $SiO_2$ layer 212 is formed on the i-Si layer 203 and the $p^+$-Si layer 206 on the other side of the i-SiGe layer 204. On the $SiO_2$ layer 211, a p-poly Si layer 213 (with an acceptor density being up to $1 \times 10^{17} cm^{-3}$) is formed in contact with the i-SiGe layer 204, and a $p^+$-poly Si layer 214 is formed on the outer side of the p-poly Si layer 213. On the $SiO_2$ layer 212, an n-poly Si layer 215 (with a donor density being up to $1 \times 10^{17} cm^{-3}$) is formed in contact with the i-SiGe layer 204, and an n+-poly Si layer 216 is formed on the outer side of the n-poly Si layer 215. Electrodes 217 and 218 are formed on the $p^+$-poly Si layer 214 and the $n^+$-poly Si layer 216, respectively, and voltages can be applied from outside.

The i-Si layer 203 and the i-SiGe layer 204 serve as the first low-impurity-density semiconductor layer, the p-type poly Si layers 213 and 214 serve as the first p-type semiconductor layer (the hole injection layer), the n-type poly Si layers 215 and 216 serve as the first n-type semiconductor layer (the electron injection layer), the $p^+$-Si region 206 serves as the second p-type semiconductor layer (the drain for holes), and the $n^+$-Si region 205 serves as the second n-type semiconductor layer (the drain for electrons).

The structure and operations of the entire interferometer are substantially the same as those of the above described second embodiment (see FIGS. 7 and 9), and therefore, explanation of them will not be repeated. Light that is divided by the input MMI 52 is guided to the output MMI 54 through the phase modulators 56a and 56b. At the phase modulators 56a and 56b, the portion having the i-SiGe layer 204 with a higher refractive index than that of the surrounding area serves as the core of the optical waveguide. By applying suitable voltages to the respective semiconductor layers via the electrodes 207, 208, 217 and 218, the carrier density in the i-SiGe layer 204 is modulated, and the effective refractive index of the optical waveguide having the i-SiGe layer 204 at the core is changed. As a result, the phase of the transmitted light is modulated.

First, an operation to be performed in a case where the electrodes 207 and 208 are not connected to the outside, the electrode 218 is grounded, and a positive voltage $V_F$ is applied to the electrode 217 is described. When no voltages are applied, the i-SiGe region 204 serves as the potential barrier against holes and electrons, and therefore, no currents flow. As the voltage to be applied to the electrode 217 is made higher, the field intensity in the i-SiGe region 204 becomes higher, and the effective potential barrier of the i-SiGe layer 204 viewed from the p-poly Si layer 213 and the n-poly Si layer 215 becomes lower. Therefore, holes and electrons are injected into the i-SiGe layer 204 through the p-poly Si layer 213 and the n-poly Si layer 215. Since the hetero junctions between the i-SiGe layer 204 and the surrounding Si layers 203, 213, and 215 serve as barriers, the electrons and holes stay in the i-SiGe layer 204. Accordingly, the current flows mainly because of the carrier recombination in the i-SiGe layer 204. As a result, responses from the phase modulators are restricted by the carrier lifetime (several hundreds of picoseconds to several nanoseconds), and high-speed and high-efficiency phase modulation cannot be performed without preemphasis.

Next, a case where a voltage Vnd that is higher than $V_F/2$ is applied to the electrode 207, and a voltage Vpd that is lower than $V_F/2$ is applied to the electrode 208 is described. As the voltage differences $|V_{nd}-V_F/2|$, $|V_F/2-V_{pd}|$ are made larger, the field intensity in the slab region of the i-Si layer 203 becomes higher. Because of the influence of the increase in the field intensity, the heterobarrier against electrons becomes lower on the lower right side of the i-SiGe layer 204 in FIG. 10, and the heterobarrier against the holes becomes lower on the lower left side of the i-SiGe 204. Accordingly, by adjusting the voltage differences $|V_{nd}-V_F/2|$, $|V_F/2-V_{pd}|$, the discharge rate of the electrons and holes from the i-SiGe layer 204, or the effective carrier lifetime, can be controlled.

The voltage to be applied between the electrode 207 and the electrode 217, and the voltage to be applied between the electrode 208 and the electrode 218 are appropriately varied as functions of the voltage $V_F$ to be applied between the electrode 217 and the electrode 218. In this manner, high-speed phase modulation with low power consumption can be performed. If the carrier blocking effect of the heterobarriers and the carrier discharge rate of the drains are appropriately balanced with each other, the electrode 207 and the electrode 217, and the electrode 208 and the electrode 218 can of course be connected to each other (commonalized), or a predetermined fixed voltage can be applied to each of the electrodes 207 and 208.

In this embodiment, various modifications may be made to the arrangement of the first p-type semiconductor layer (the hole injection layer), the first n-type semiconductor layer (the electron injection layer), the second p-type semiconductor layer (the drain for holes), and the second n-type semiconductor layer (the drain for electrons), which surround the first low-impurity-density semiconductor layer. Also, various modifications may be made to the existence of a semiconductor region having a small forbidden bandwidth and the location of such a semiconductor region.

However, unlike the devices of the first and second embodiments having pin diode structures, the device of this embodiment has the characteristics of a nin structure and a pip structure. Therefore, depending on which structure the device has, a large potential slope may be formed in the first low-impurity-density semiconductor layer, and drift current may flow. As a result, the carrier density cannot be increased sufficiently, or electrons and holes may be unevenly distributed. To avoid this problem, it is preferable to form a semiconductor region having a smaller band gap in the optical waveguide structure, and/or arrange the injection layers and the drains in such a manner that the electron flow pass and the hole flow pass cross each other in the first low-impurity-density semiconductor layer, as in this embodiment. With this arrangement, the carriers are easily confined in the first low-impurity-density semiconductor layer, and the potential and carrier distributions can be readily made almost uniform, by virtue of the attracting force between the electrons and the holes, and a screening effect. As a result, the overlapping between the region where the waveguide mode changes and the region where the carrier density varies can be enhanced, and the carrier density variation with the variation of voltage can be made larger.

This embodiment is not limited to the above described embodiment, and various modifications and applications can be made to this embodiment without departing from the scope of the invention. The p-poly Si layer 213 and the n-poly Si layer 215 may have impurity densities that increase from the i-SiGe layer 204 toward the poly Si layers 214 and 216, or layers having intermediate impurity densities may be interposed between the i-Si layer 203 and the $n^+$-Si region 205 and between the i-Si layer 203 and the $p^+$-Si region 206. Alternatively, the $SiO_2$ layers 211 and 212 may be made thicker on the electrode sides, to reduce the capacitance between the $n^+$-Si layer 205 and the $p^+$-poly Si layer 214, and the capacitance between the p+-Si layer 206 and the n+-poly Si layer 216. It is of course possible to combine this embodiment with an optical modulator of a ring resonator type.

As described so far in detail, this embodiment can provide an optical modulation device that is capable of operating at a higher speed than a conventional optical modulation device of a pin-structure carrier-injection type, and is smaller in size and is capable of operating at a lower voltage than an optical modulation device of a pn reverse-bias type (a depletion mode). With the use of the optical modulation device of this embodiment, high-speed optical modulation can be performed at a low voltage without preemphasis.

Additional advantages and modification will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An optical modulation device comprising:
a first p-type semiconductor region;
a first n-type semiconductor region;
a first low-impurity-density semiconductor region formed between the first p-type semiconductor region and the first n-type semiconductor region;
a second n-type semiconductor region formed on an outer side of the first p-type semiconductor region via a second low-impurity-density semiconductor region; and
a second p-type semiconductor region formed on an outer side of the first n-type semiconductor region via a third low-impurity-density semiconductor region, a carrier density in the first low-impurity-density semiconductor region being changed by current injection, a phase of light propagated through an optical waveguide structure being modulated, the optical waveguide structure including at least part of the first low-impurity-density semiconductor region,
wherein the first p-type semiconductor region is connected to a first electrode via a p-type semiconductor layer,
the second n-type semiconductor region is connected to the first electrode via a n-type semiconductor layer,
the first n-type semiconductor region is connected to a second electrode via a n-type semiconductor layer, and
the second p-type semiconductor region is connected to a second electrode via a p-type semiconductor layer.

2. The device according to claim 1, wherein the first p-type semiconductor region and the second n-type semiconductor region are electrically connected and have substantially the same potentials, and the first n-type semiconductor region and the second p-type semiconductor region are electrically connected and have substantially the same potentials.

3. The device according to claim 1, wherein each of the semiconductor regions has Si as a main component.

4. The device according to claim 1, wherein an impurity density in the first low-impurity-density semiconductor region is equal to or lower than 1016 cm−3.

5. An optical modulation device comprising:
a first low-impurity-density semiconductor region;
a first p-type semiconductor region;
a first n-type semiconductor region;
an electron drain formed by a first i-type region and a second n-type semiconductor region; and
a hole drain formed by a second i-type region and a second p-type semiconductor region,
the first p-type semiconductor region, the first n-type semiconductor region, the second p-type semiconductor region, and the second n-type semiconductor region surrounding the first low-impurity-density semiconductor region,
the electron drain being formed on an outer side of the first p-type region,
the hole drain being formed on an outer side of the first n-type region,
a carrier density in the first low-impurity-density semiconductor region being changed by varying a voltage between at least two of the first p-type semiconductor region, the first n-type semiconductor region, the second p-type semiconductor region, and the second n-type semiconductor region, a phase of light propagated in an optical waveguide structure being modulated, the optical waveguide structure including at least part of the first low-impurity-density semiconductor region.

6. The device according to claim 5, wherein, when carriers are injected into the first low-impurity-density semiconductor region by applying a voltage, a hole flow pass from the first p-type semiconductor region to the second p-type semiconductor region and an electron flow pass from the first n-type semiconductor region to the second n-type semiconductor region cross each other in the first low-impurity-density semiconductor region.

7. The device according to claim 5, wherein the first p-type semiconductor region and the second n-type semiconductor region are electrically connected and have substantially the same potentials, and the first n-type semiconductor region and the second p-type semiconductor region are electrically connected and have substantially the same potentials.

8. The device according to claim 5, wherein each of the semiconductor regions has Si as a main component.

9. The device according to claim 5, wherein an impurity density in the first low-impurity-density semiconductor region is equal to or lower than $10^{16}$ cm$^{-3}$.

10. The device according to the claim 5, further comprising:
a first electrode on the second n-type semiconductor region; and
a second electrode on the second p-type semiconductor electrode.

11. The device according to the claim 5, further comprising:
a third p-type semiconductor region being formed on the other outer side of the first p-type semiconductor region;
a third n-type semiconductor region being formed on the other outer side of the first n-type semiconductor region;
a first electrode on the second n-type semiconductor region and the third p-type semiconductor region; and
a second electrode on the second p-type semiconductor electrode and the third n-type semiconductor region.

12. An optical modulation device comprising:
a first low-impurity-density semiconductor region;
a first p-type semiconductor region;

a first n-type semiconductor region;
an electron drain formed by a second p-type semiconductor region;
a hole drain formed by a second n-type semiconductor region;
a i-type SiGe semiconductor region formed on the first low-impurity-density semiconductor region;
a third n-type semiconductor region connected to the i-type SiGe semiconductor region via a forth p-type semiconductor region;
a third p-type semiconductor region connected to the i-type SiGe semiconductor region via a forth n-type semiconductor region;
a first electrode formed on the first n-type semiconductor region;
a second electrode formed on the first p-type semiconductor region;
a third electrode formed on a second n-type semiconductor region; and
a forth electrode formed on a second p-type semiconductor region,
the first electrode, the second electrode, the third electrode and the forth electrode being able to be applied voltage,
a carrier density in the first low-impurity-density semiconductor region being changed by varying a voltage between at least two of the first p-type semiconductor region, the first n-type semiconductor region, the second p-type semiconductor region, and the second n-type semiconductor region, a phase of light propagated in an optical waveguide structure being modulated, the optical waveguide structure including at least part of the first low-impurity-density semiconductor region.

13. The device according to claim 12, wherein a portion having a small forbidden bandwidth exists at least in the optical waveguide structure of the first low-impurity-density semiconductor region, the small forbidden bandwidth being smaller than forbidden bandwidths of other portions of the semiconductor region.

14. The device according to claim 12, wherein an impurity density in the first low-impurity-density semiconductor region is equal to or lower than $10^{16}$ cm$^{-3}$.

* * * * *